United States Patent
Pellizzari et al.

(10) Patent No.: US 7,017,344 B2
(45) Date of Patent: Mar. 28, 2006

(54) MACHINE SPRING DISPLACER FOR STIRLING CYCLE MACHINES

(76) Inventors: Roberto O. Pellizzari, 95 Raddin Rd., Groton, MA (US) 01450; David Gedeon, 16922 S. Canaan Rd., Athens, GA (US) 45701; Laurence Penswick, 121 Carefree Dr., Stevenson, WA (US) 98648

( * ) Notice: Subject to any disclaimer, the term of this patent is extended or adjusted under 35 U.S.C. 154(b) by 0 days.

(21) Appl. No.: 10/665,914

(22) Filed: Sep. 19, 2003

(65) Prior Publication Data

US 2005/0060996 A1 Mar. 24, 2005

(51) Int. Cl.
*B21D 53/00* (2006.01)
*B23H 1/00* (2006.01)
*F16F 1/06* (2006.01)
*F25B 9/14* (2006.01)

(52) U.S. Cl. .................. 60/517; 60/519; 60/520
(58) Field of Classification Search ............. 60/517, 60/519, 520; 62/6
See application file for complete search history.

(56) References Cited

U.S. PATENT DOCUMENTS

| | | | |
|---|---|---|---|
| 3,788,772 A * | 1/1974 | Noble et al. ................ | 62/6 |
| 3,848,877 A | 11/1974 | Bengtsson et al. | |
| 3,886,513 A | 5/1975 | Smith et al. | |
| 4,811,563 A | 3/1989 | Furuishi ................ | 60/517 |
| 4,945,726 A | 8/1990 | Beale .................... | 60/520 |
| 5,522,214 A | 6/1996 | Beckett et al. | |
| 5,737,925 A * | 4/1998 | Sekiya et al. ............ | 60/520 |
| 5,873,246 A * | 2/1999 | Beale .................... | 60/520 |
| 5,944,302 A | 8/1999 | Loc et al. ............... | 267/180 |
| 6,151,896 A * | 11/2000 | Veringa et al. .......... | 60/517 |
| 6,256,997 B1 * | 7/2001 | Longsworth ............ | 60/520 |
| 6,492,748 B1 | 12/2002 | Corey | |
| 6,510,689 B1 | 1/2003 | Budliger | |
| 2003/0066282 A1 | 4/2003 | Kamen et al. | |

FOREIGN PATENT DOCUMENTS

| | | |
|---|---|---|
| DE | 40 33 945 A | 5/1992 |
| JP | 62209239 A | 9/1987 |
| JP | 2000039222 A * | 2/2000 |

* cited by examiner

*Primary Examiner*—Sheldon J Richter

(57) ABSTRACT

A displacer spring and displacer/spring assembly for use in an FPSE and with improved wear characteristics. One embodiment calls for the use of a single machined spring operating alternately in a tension mode and a compression mode and wherein the operating frequency of displacer movement can be controlled therewith to a desired resonant frequency. The machined spring of the present invention provides enhanced structural accuracy which, in turn, leads to the elimination of lateral and side loads as compared to prior art wire-wound helical springs.

21 Claims, 3 Drawing Sheets

MACHINE SPRING DISPLACER FOR STIRLING CYCLE MACHINES

FIELD

This invention relates generally to free-piston Stirling engines and more particularly to displacer construction within such engines.

BACKGROUND

A Stirling engine is characterized by having an external heat source as contrasted with an internal combustion engine. The external heat source can come from the combustion of fossil fuels, concentrated solar energy, heat from the decay of radioactive isotopes, hot exhaust gasses from diesel engines, or any other source of heat. Early Stirling engines used air, but modern ones use a gas such as Helium at high pressures to both improve performance and reduce engine physical size.

There are two main methods of transmitting forces from the Stirling power piston to perform useful mechanical work on a load such as an electrical generator. In a so-called "kinematic" design, a power piston, and a displacer piston, if utilized, are connected to a crankshaft, as in a conventional internal combustion engine. The power piston and, if applicable, the displacer piston turn a load such as a rotary electrical generator. In this case, piston excursion is constrained to limits established by the piston's rigid mechanical connection to the crankshaft.

The second configuration is the so-called "free piston" Stirling engine ("FPSE") wherein a mechanically unconstrained power piston and displacer fundamentally move in linear simple harmonic motion at a frequency nominally equal to a natural mode determined by piston and displacer masses, various restoring spring rates provided by pneumatic, mechanical or other means, and damping effects occurring during engine operation. Typically, FPSE piston displacement is controlled by an appropriate dynamic balancing of input heat flux and mechanical loading to avoid excursions beyond design limits which would cause undesired impact with the cylinder ends. In one typical FPSE application, the power piston is connected by a rigid rod to a cylindrical magnetic structure (often called a "mover") which cooperates with the fixed portion of a linear electrical alternator. The back and forth movement of the mover/power piston generates an AC voltage at the output of the alternator.

In some applications, the FPSE configuration is preferred to its kinematic alternative, one distinct advantage being that the FPSE virtually eliminates piston-cylinder wall normal forces avoiding the need to lubricate these surfaces and means to isolate lubricant-intolerant engine components.

A cross sectional view of a generic FPSE/linear alternator (FPSE/LA) combination 10 is illustrated in FIG. 1 with the FPSE portion 50 to the left of the figure and the alternator portion 60 to the right of the figure. A gas-tight case 12 contains a freely moving displacer 14 guided by a fixed displacer rod 16. A movable power piston 18 is connected to a permanent magnet structure 20. Various ring seals (not illustrated) may be used to form a gas tight seal between the displacer 14 and power piston 18 and internal part of the case 12. Alternatively, tight radial clearances may be used to limit leakage flows around the pistons and displacer components.

Usually, the four central spaces inside the case are denominated as follows. The space between the displacer 14 and the case 12 is the expansion space 32; the space inside the displacer 14 may serve as a gas spring 34, the space between the displacer 14 and the power piston 18 is the compression space 36; and the space between the power piston 18 and the case 12 is the bounce space 38. The case 12 may be mounted on mechanical springs (not illustrated). Thermal energy to run the Stirling engine is supplied by a heater 40 on the outside of the case 12.

Control of displacer movement both in terms of excursion and its phase relationship to the power piston motion are important factors in FPSE design. In particular, it is advantageous to configure the displacer so that it operates at or near its natural resonant frequency. By enforcing this requirement, many benefits are obtained including engine operation at or near peak efficiency (i.e. for a given input, a higher engine output is obtained).

Prior art solutions generally employ springs of various types in connection with the tuning of displacer movement to a selected resonant frequency based upon particular spring characteristics. Such springs are located within the regions 34 and 36 of the FPSE illustrated in FIG. 1. Typically, in the case of a mechanical spring, the spring is formed as a helical wire and is linked to the displacer 14 and connected between the end of the displacer rod and its cylinder housing.

Natural resonant frequency is a function of both the mass of the collective moving body (displacer and spring) and the spring rate. A given mass-spring system can be tuned to operate at the desired frequency through the control of these two elements in conjunction with the expected damping effect during engine operation. Each particular spring has a single force constant which is determined by its material, geometrical configuration and Hooke's law.

Unfortunately, various drawbacks exist with respect to the use of springs in connection with the control of displacer movement to a particular frequency. Conventional coil springs require the use of a pair of springs deployed in opposition to one another such that the displacer can be controlled in both directions along an axial path. The need for two springs rather than one adds cost and an additional failure point. Another particular problem associated with displacer springs in FPSEs is a less than desirable component life. Prior art mechanical coil springs tend to wear out by flaking, fatiguing and ultimately failing. Various characteristics of prior art spring constructions lead to this result. For example, radially directed and side forces and/or bending moments are applied by the springs upon the displacer and the displacer rod. This can result in decreased wear life both with respect to the spring and with respect to the displacer itself. Further, these side forces increase the static friction between the walls of the displacer rod and the cylinder and can thus also have the effect of impeding initial engine starting.

Additionally, rubbing of the displacer 14 against the containing wall may result if the displacer 14 is not properly centered initially or if it moves off-center as a result of spring changes or spring movement. This is because conventionally coiled spring solutions do not provide any radial stiffness to assist in maintaining the displacer 14 centered on axis.

Another drawback associated with prior art mechanical coil spring solutions is the requirement for a pre-load wherein each of the pair of springs is under some degree of compression at all times even when the displacer 14 is in its rest position. Pre-load is needed to prevent the springs from rattling which, in turn, can cause noise and particulate contamination. Unfortunately, however, pre-loading causes higher stress levels and decreased spring life compared to what could be obtained without a pre-load. Additionally, opposed coil spring designs which are currently in use typically require the use of additional compression space and surface area within the FPSE to accommodate the spring.

Other spring configurations have also been used in connection with displacer control. For example, flat "flexure" or "planar" mechanical spring configurations have been employed in displacer control applications. While these spring configurations typically provide low wear and resulting long life, the mechanical design of the displacer must typically accommodate the unique spring characteristics resulting in more complex displacer design requirements. Additionally, "flat" mechanical spring configurations can be relatively expensive as compared to traditional coiled spring configurations.

SUMMARY

One aspect is to provide a displacer and spring assembly that addresses the drawbacks described above.

Another aspect is to provide a spring for use in connection with a displacer in an FPSE which provides an enhanced operating life in comparison to conventional mechanical coil springs.

Yet another aspect is to provide a spring for use in connection with a displacer in an FPSE which results in diminished displacer wear.

Another aspect is to provide a spring for use in connection with a displacer in an FPSE which generates minimal or no side forces or bending moments on the displacer component.

A still further aspect is to provide a spring and displacer assembly for use in connection an FPSE with reduced compression space volume and surface area requirements.

A preferred form of the displacer spring of the present invention includes various embodiments. One such embodiment calls for the use of a machined spring with multiple coils. The multiple coils of the machined spring of the present invention serve to minimize bending moments and side loads as compared to a single coil solution which results in an unbalanced load transfer to any bounding structure. Through the use of the machined spring of the present invention, the footprints of the coils may be geometrically balanced to prevent the negative effects described above. The machined spring of the present invention operates alternately in a tension mode and a compression mode and allows the operating frequency of displacer movement to be controlled therewith to a desired resonant frequency. The machined spring of the present invention further provides enhanced structural accuracy which, in turn, leads to the minimization of lateral and side loads as compared to prior art wire-wound helical springs. Additionally, the two mechanical coiled springs typically employed in the prior art with respect to each displacer may be replaced with a single machined spring according to the teachings of the present invention.

Other embodiments of the present invention are also possible as described in further detail below and as will be understood by one of skill in the art.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION OF THE PREFERRED EMBODIMENTS

Figure 1:
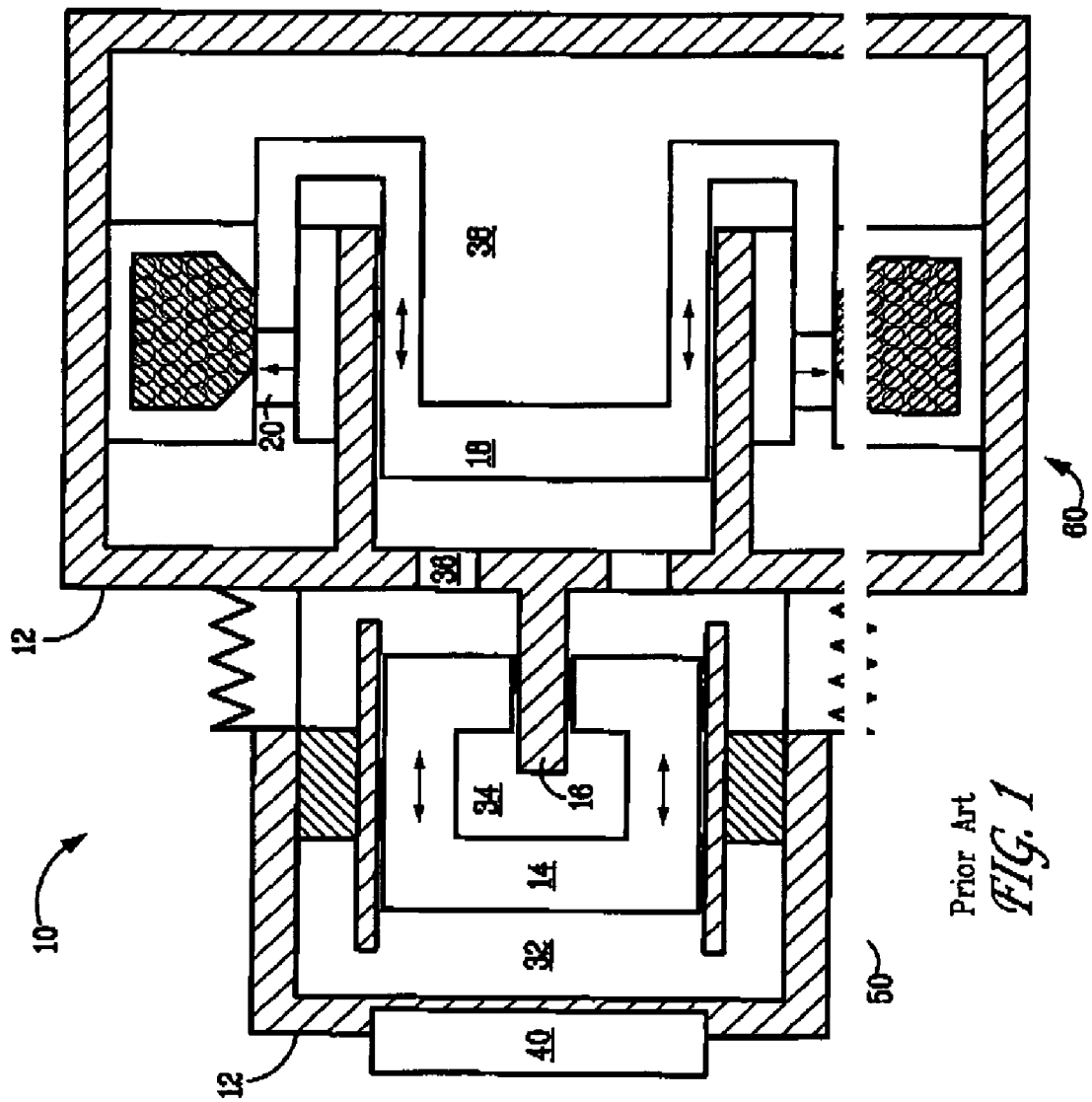
FIG. 1 illustrates the basic structure of a FPSE/LA system as is known in the art.
Figure 2:
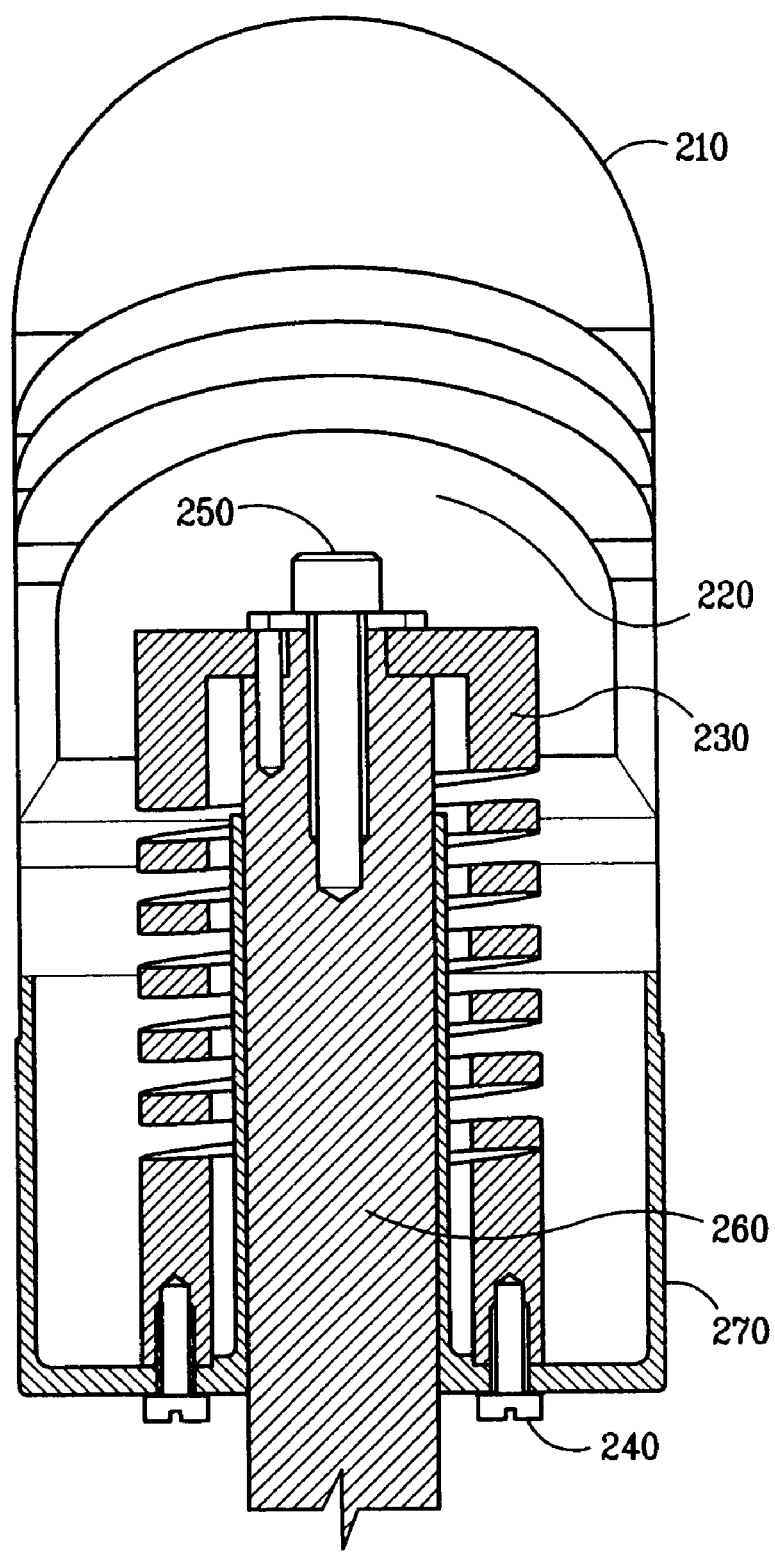
FIG. 2 is a sectional view of the displacer/machined spring assembly according to a preferred embodiment of the present invention.
Figure 3:
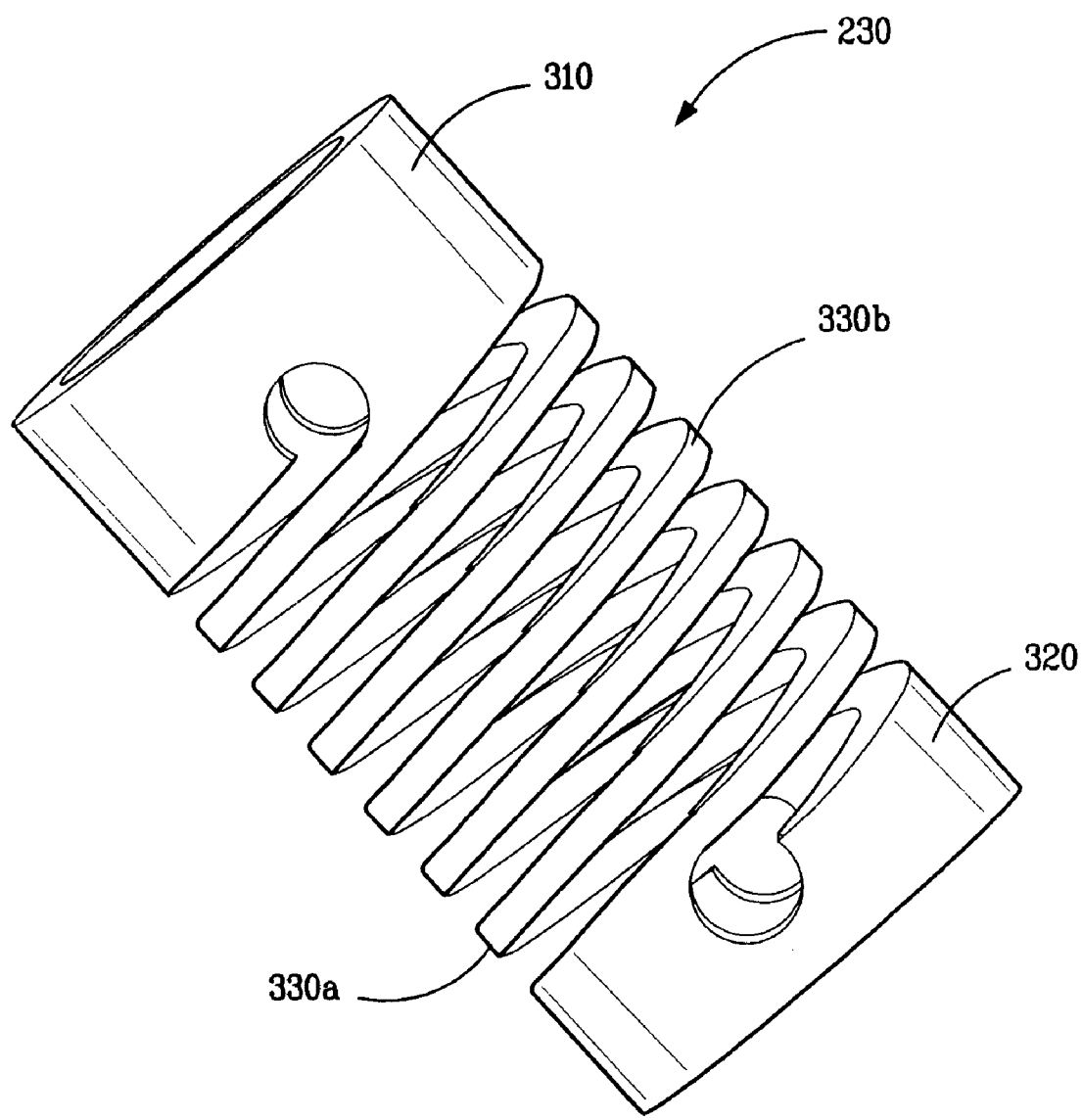
FIG. 3 is a close-up side view of a machined spring for use in connection with displacer operating frequency control according to a preferred embodiment of the present invention.

Reference is now made to the embodiments illustrated in FIGS. 1–3 wherein like numerals are used to designate like parts throughout.

FIG. 2 illustrates a displacer assembly 220 shown mounted to a displacer rod 260. The displacer rod 260 is attached to the engine casing (not shown). The displacer assembly 220 consists of a displacer seal body 270, a displacer cap assembly 210 and a machined spring 230. The machined spring 230 is attached to the displacer seal body 270 with mounting screws 240, and to the displacer rod 260 with a mounting screw 250.

In this way, during displacer reciprocation, one end of machined spring 230 remains fixed in place via pin assembly 240 while machined spring 230 is free to expand and contract in direct relationship with the movement of displacer 220. While it is important that machined spring 230 be free to expand and contract in direct relationship with the movement of displacer 220, the above disclosed mechanism for attaching machined spring 230 to displacer rod 260 is only one of many possible ways of providing attachment. So long as machined spring 230 is fixed in place at one and free to expand and contract at the other, the benefits of the present invention may be obtained. Thus, the invention is not necessarily limited to the disclosed embodiment for affixing machined spring 230.

In accordance with the teachings of the present invention, displacer 220 and machined spring 230 are designed such that the moving mass and the force constant of machined spring 230 provide a combination which is mechanically resonant at the desired frequency.

According to one preferred embodiment of the present invention, machined spring 230 of the present invention may be formed according to the following specifications. Spring steel with an E value of 3.05 E7 PSI and with a P. ratio of 0.28. Such a spring may be obtained, for example, from Helical Products Company located in Santa Maria, Calif. According to one preferred embodiment of the present invention, the machined spring of the present invention may take the following form.

Material: 15-5PH CRES (Heat Treat H900 per AMS 5659)

Construction: Single piece machined from rod stock.

Size: ~83 mm long by ~44 mm outside diameter by ~28 mm inside diameter.

Configuration: Two intertwined coils having ~3 turns each. The individual turns/coils are roughly 3.2 mm high spanning from inside diameter to outside diameter, and are spaced roughly 3.2 mm apart. Axial positioning of the coils within the length of the spring can be varied to modify the natural frequency of the spring. Positioning the coils closer to the end of the spring that is attached to the displacer reduces the total moving mass, and thus increases the natural frequency of the system. Positioning the coils closer to the end of the spring that is attached to the displacer rod increases the total moving mass, and thus decreases the natural frequency of the system.

While the above is one preferred form of the machined spring of the present invention, it will be recognized by those of skill in the art that various other spring characteristics including varying the spring size, shape or material may be substituted for the above without departing from the scope or spirit of the present invention. For example and without limitation, the material used in forming the machined spring of the present invention is not necessarily limited to the classical "spring steels" normally used in wire coil springs—both ferrous and non-ferrous materials with the desired mechanical properties (fatigue strength and ease of manufacture) can be utilized as opposed to the case when a traditional wire coil spring is used.

FIG. 3 is a close-up side view of a machined spring that may be employed in connection with the teachings of the present invention. As can be seen, machined spring 230 includes two end portions 310 and 320 and two helical coils 330*a* and 330*b* located between end portions 310 and 320. While the embodiment in FIG. 3 shows the use of two coils, it will be understood by one of skill in the art that a larger number of coils could also be used to form the spring such as, for example, three or more coils.

Given a machined spring with the above characteristics, testing has shown that with either an axial compressive loading of 50 lbs or an axial tensile loading of 50 lbs, the maximum Von-mises stress is on the order of 30 Ksi. Further, the maximum deflection resulting from the axial load is 0.09 inches. The resulting equivalent spring stiffness for the tested spring is 554 lbf/in. Most importantly, in the case of purely axial spring forces, testing has shown essentially no contact or wear of the springs or the displacer over approximately 200 hours of operation.

As will be apparent to one of skill in the art, the particular machined spring characteristics described above are merely exemplary and the invention may be practiced using machined springs with different physical characteristics as required or desirable in connection with various applications.

Through the use of a machined spring operating alternately in tension and compression in connection with displacer reciprocation, various benefits can be achieved. As described above, component centering can be more easily achieved as against prior art helical wire springs and rubbing can thus be easily minimized as can component wear. Further, due to the higher spring forces achievable with the machined springs used in connection with the present invention, reduced compression space volume and surface area can be achieved since the machined spring may be entirely contained within the displacer.

A machined spring and displacer/spring assembly for use in connection with an FPSE has been disclosed. It will be understood that the teachings provided above have a great many applications particularly to those associated with the control of reciprocating members in general. For example, the helical spring of the present invention may also be used in connection with other reciprocating members in Stirling engines such as with the power piston and/or in connection with the alternator. While the subject invention has been illustrated and described in detail in the drawings and foregoing description, the disclosed embodiments are illustrative and not restrictive in character. All changes and modifications that come within the scope of the invention are desired to be protected.

What is claimed is:

1. A displacer in a free piston Stirling engine comprising:
   a displacer rod;
   a displacer housing within which said displacer rod reciprocates; and
   a machined spring attached at a first end to at least a portion of said displacer rod and providing a constraining force upon said displacer rod when said displacer rod moves in either a first axial direction or a second axial direction within said displacer housing, said machined spring further including first and second end portions and a plurality of helical coils located therebetween;
   wherein said machined spring is characterized such that the mass of said displacer and said displacer rod and the force constant of said machined spring results in mechanical resonance at the operating frequency of a free piston Stirling engine containing said displacer.

2. The displacer of claim 1 wherein said machined spring is attached at a second end of said machined spring to said displacer housing.

3. The displacer of claim 1 wherein said plurality of helical coils are intertwined.

4. The displacer of claim 1 wherein said machined spring is contained within said displacer.

5. The displacer of claim 1 wherein said machined spring is formed as at least two intertwined coils of material.

6. The displacer of claim 5 wherein said material is steel.

7. A free piston Stirling engine comprising:
   a displacer;
   a housing within which displacer reciprocates in both a first axial direction and a second axial direction; and
   a machined spring having a first end and a second, said first end attached to said displacer and providing a constraining force upon said displacer when said displacer moves in either said first axial direction or said second axial direction, said second end at said machined spring attached to a displacer rod, said machined spring further including first and second end portions and a plurality of helical coils located therebetween;
   wherein said machined spring is characterized such that the mass of said displacer and said displacer rod and the force constant of said machined spring results in mechanical resonance at the operating frequency of said free piston Stirling engine.

8. The free piston Stirling engine of claim 7 wherein said helical coils are intertwined.

9. The free piston Stirling engine of claim 7 wherein said machined spring is formed from a single piece of rod stock.

10. The free piston Stirling engine of claim 7 wherein said machined spring is contained within said displacer.

11. The free piston Stirling engine of claim 7 wherein said machined spring is attached to said displacer with at least one mounting screw.

12. The free piston Stirling engine of claim 7 wherein said machined spring is formed as at least two intertwined coils of material.

13. The free piston Stirling engine of claim 12 wherein said material is steel.

14. A method of optimizing a free piston Stirling engine having a displacer and displacer rod, comprising the steps of:
   (a) machining a displacer spring having a first end, a second end and a length defined by the distance between the first end and the second end;

(b) positioning a plurality of coils within the length of the displacer spring so as to optimize a natural frequency of the spring; and (c) installing the spring so machined by attaching the first end to at least a portion of the displacer rod and providing a constraining force upon the displacer rod when the displacer rod moves within a displacer housing of the free piston Stirling engine in either a first axial direction or a second axial direction;

wherein in step (b) positioning the coils closer to the second end of the spring reduces total moving mass, thereby increasing the natural frequency of the free piston Stirling engine and positioning the coils closer to the first end of the spring increases total moving mass, thereby decreasing the natural frequency of the free piston Stirling engine.

15. The method of claim 14, wherein the displacer spring is attached at the second end to a displacer housing.

16. The method of claim 14, wherein the displacer spring is formed as at least two intertwined coils of material.

17. The method of claim 14, wherein the displacer spring is contained within the displacer.

18. The method of claim 14, wherein the displacer spring is characterized such that the mass of the displacer and the displacer rod and the force constant of the displacer spring results in mechanical resonance at the operating frequency of a free piston Stirling engine containing the displacer.

19. The method of 18, wherein the plurality of coils is of helical configuration.

20. The method of 18, wherein the material of the displacer spring is steel.

21. The method of claim 20, wherein the plurality of helical coils is intertwined.

* * * * *

UNITED STATES PATENT AND TRADEMARK OFFICE
CERTIFICATE OF CORRECTION

| | | |
|---|---|---|
| PATENT NO. | : 7,017,344 B2 | Page 1 of 1 |
| APPLICATION NO. | : 10/665914 | |
| DATED | : March 28, 2006 | |
| INVENTOR(S) | : Roberto O. Pellizzari et al. | |

It is certified that error appears in the above-identified patent and that said Letters Patent is hereby corrected as shown below:

Column 6,
Line 37, delete "at" and replace with -- of --.

Column 8,
Lines 10 and 12, "18" should read -- claim 18 --.

Signed and Sealed this

Fourth Day of July, 2006

JON W. DUDAS
*Director of the United States Patent and Trademark Office*